US012638181B2

(12) United States Patent
Venturato et al.

(10) Patent No.: US 12,638,181 B2
(45) Date of Patent: May 26, 2026

(54) TURBINE ENGINE AND COMBUSTOR THEREFOR

(71) Applicant: GENERAL ELECTRIC COMPANY, Schenectady, NY (US)

(72) Inventors: Marco Venturato, Lebanon, OH (US); Bernard Gustav Knolle, Rowley, MA (US); James Shealy, Cincinnati, OH (US); Pradeep Naik, Bengaluru (IN); Brian M. Royer, Newburyport, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/671,356

(22) Filed: May 22, 2024

(65) Prior Publication Data

US 2025/0362017 A1     Nov. 27, 2025

(51) Int. Cl.
*F23R 3/12*          (2006.01)
*F02C 7/22*          (2006.01)

(52) U.S. Cl.
CPC .................. *F23R 3/12* (2013.01); *F02C 7/22* (2013.01); *F05D 2260/14* (2013.01)

(58) Field of Classification Search
CPC ...... F23R 3/12; F23R 3/14; F23R 3/28; F23R 3/286; F23R 3/30; F23R 3/32
See application file for complete search history.

(56) References Cited

U.S. PATENT DOCUMENTS 2,616,258 A     11/1952  Mock
5,836,282 A     11/1998  Mallen et al.

| | | |
|---|---|---|
| 5,918,465 A | 7/1999 | Schmid |
| 6,920,758 B2 | 7/2005 | Matsuyama et al. |
| 7,017,329 B2 | 3/2006 | Farhangi et al. |
| 7,343,745 B2 | 3/2008 | Inoue et al. |
| 8,065,880 B2* | 11/2011 | Ishizaka .................... F23R 3/14 |
| | | 60/737 |
| 8,161,751 B2 | 4/2012 | Hall |
| 8,186,165 B2* | 5/2012 | Dinu ......................... F23R 3/30 |
| | | 431/11 |
| 8,210,214 B2 | 7/2012 | Casey et al. |
| 8,266,911 B2 | 9/2012 | Evulet |

(Continued)

FOREIGN PATENT DOCUMENTS

JP         2006112670 A      4/2006
WO      2023235078 A1     12/2023

OTHER PUBLICATIONS

European Search Report issued in corresponding application EP25169334.7 dated Aug. 20, 2025.

*Primary Examiner* — Gerald L Sung
*Assistant Examiner* — Sean V Meiller
(74) *Attorney, Agent, or Firm* — Carter, DeLuca & Farrell, LLP

(57)          ABSTRACT

A turbine engine having a compressor section, a combustion section having a combustor, and a turbine section in serial flow arrangement. The combustor includes a combustion chamber, at least one fuel injector, and a center body located within an air flow path of the fuel injector, where the center body has an internal fuel supply path. A vortex generator is provided on the center body and at least one fuel supply passage includes outlets that emit fuel into the air flow path for mixing the fuel with air in the air flow path.

15 Claims, 10 Drawing Sheets

(56)          References Cited

U.S. PATENT DOCUMENTS

| | | | | |
|---|---|---|---|---|
| 8,302,404 | B2 * | 11/2012 | Nilsson | F23D 14/70 |
| | | | | 60/737 |
| 9,279,587 | B2 * | 3/2016 | Clemen | F02K 1/386 |
| 9,557,050 | B2 * | 1/2017 | Vandervort | F23R 3/28 |
| 10,352,567 | B2 | 7/2019 | Wang et al. | |
| 10,865,989 | B2 | 12/2020 | Sadasivuni | |
| 10,890,329 | B2 | 1/2021 | Boardman et al. | |
| 10,955,138 | B2 | 3/2021 | Wirtz et al. | |
| 11,454,396 | B1 | 9/2022 | Boardman et al. | |
| 11,592,177 | B2 * | 2/2023 | Chandra | F23R 3/14 |
| 12,270,547 | B2 * | 4/2025 | Chon | F23R 3/286 |
| 2008/0041060 | A1 * | 2/2008 | Nilsson | F23R 3/20 |
| | | | | 60/737 |
| 2011/0023494 | A1 | 2/2011 | Butler et al. | |
| 2011/0031280 | A1 | 2/2011 | Kato | |
| 2013/0327011 | A1 | 12/2013 | Overby et al. | |
| 2014/0096502 | A1 * | 4/2014 | Karlsson | F02C 7/12 |
| | | | | 60/746 |
| 2014/0123653 | A1 | 5/2014 | Stoia et al. | |
| 2014/0182294 | A1 | 7/2014 | Matsumoto et al. | |
| 2016/0201918 | A1 | 7/2016 | Jella et al. | |
| 2017/0108224 | A1 | 4/2017 | Beck et al. | |

* cited by examiner

TURBINE ENGINE AND COMBUSTOR THEREFOR

TECHNICAL FIELD

The present subject matter relates generally to a gas turbine engine having a combustor.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, fuels are used in the combustor of a turbine engine. Generally, air and fuel are fed to a combustion chamber, the air and fuel are mixed, and then the fuel is burned in the presence of the air to produce hot gas. The hot gas is then fed to a turbine to produce power.

DETAILED DESCRIPTION

Figure 1:
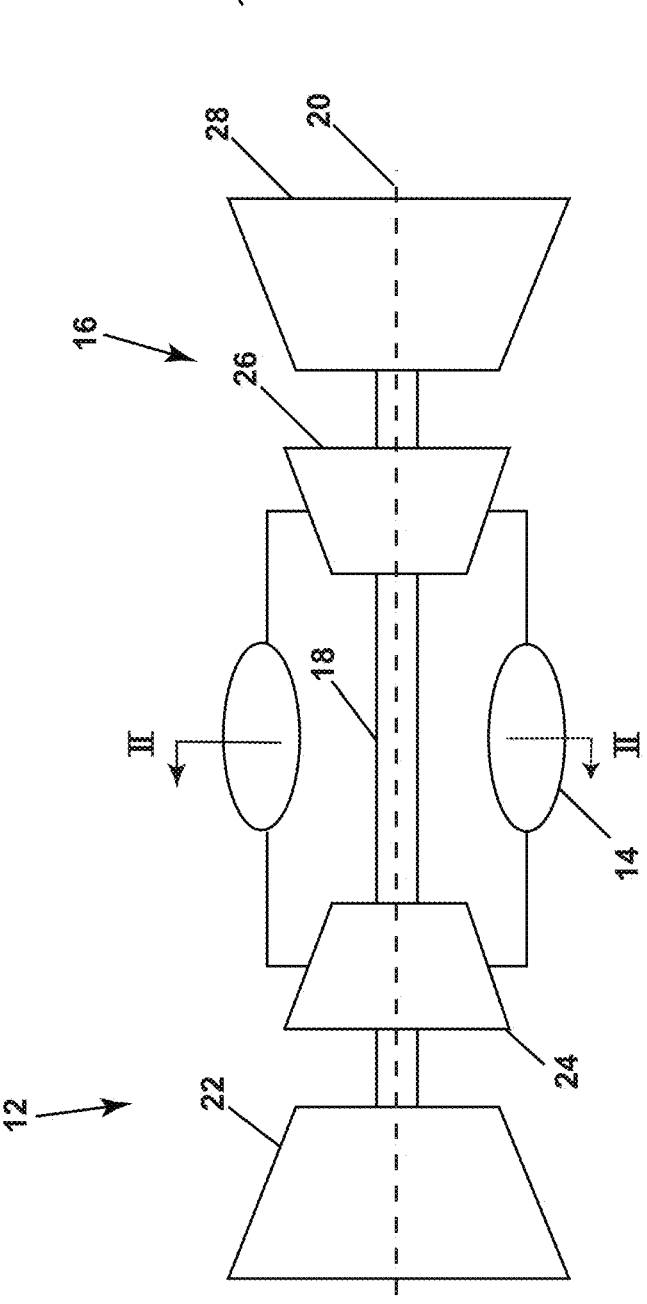
FIG. 1 is a schematic cross-sectional view of a turbine engine having a compressor section, a combustion section, and a turbine section in accordance with various aspects described herein.

Aspects of the disclosure described herein are directed to a combustor. For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first" and "second" may be used interchangeably to distinguish one component from another and are not intended to signify location or importance of the individual components.

The terms "forward" and "aft" refer to relative positions within a gas turbine engine or a vehicle, and refer to the normal operational attitude of the gas turbine engine or vehicle. For example, with regard to a gas turbine engine, forward refers to a position closer to an engine inlet and aft refers to a position closer to an engine exhaust. In FIGS. 1, 3, 4, 6, 8, and 10, forward is generally illustrated to the left, and aft/rearward is generally illustrated to the right.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid, or a combination thereof. The term "fluidly coupled" means that a fluid is capable of making the connection between the areas specified. The term "fluidly exposed" means that one or more portions of an object is contacted by a fluid.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The term "nozzle" has been used in various ways in the context of gas turbine engines. In the instant application, "nozzle" refers to a component having a portion for fluid coupling to a fuel supply and having at least one portion for fluidly coupling with a combustion chamber.

All directional references (e.g., radial, axial, upper, lower, left, right, front, back, top, bottom, above, below, vertical, horizontal, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, and connected) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only. The dimensions, positions, order, and relative sizes reflected in the drawings attached hereto can vary.

The singular forms "a", "an", and "the" include plural references unless the context clearly dictates otherwise.

Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

FIG. 1 is a schematic view of a turbine engine 10. As a non-limiting example, the turbine engine 10 can be used with an aircraft. The turbine engine 10 can include, at least, a compressor section 12, a combustion section 14, and a turbine section 16. A drive shaft 18 rotationally couples compressor section 12 and turbine section 16, such that rotation of one effects the rotation of the other and defines an engine centerline 20 for the turbine engine 10.

The compressor section 12 can include a low-pressure (LP) compressor 22, and a high-pressure (HP) compressor 24 serially fluidly coupled to one another. The turbine section 16 can include an HP turbine 26 and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of blades, vanes, and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to a casing in a circumferential manner. It is noted that there can be any number of blades, vanes, and turbine stages, as the illustrated turbine section is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan upstream of the compressor section 12, where the air is compressed, defining a pressurized air. The pressurized air can then flow into the combustion section 14 where the pressurized air is mixed with fuel and ignited to generate combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section downstream of the turbine section 16. The driving of the LP turbine 28 drives the LP spool to rotate the fan and the LP compressor 22.

Figure 2:
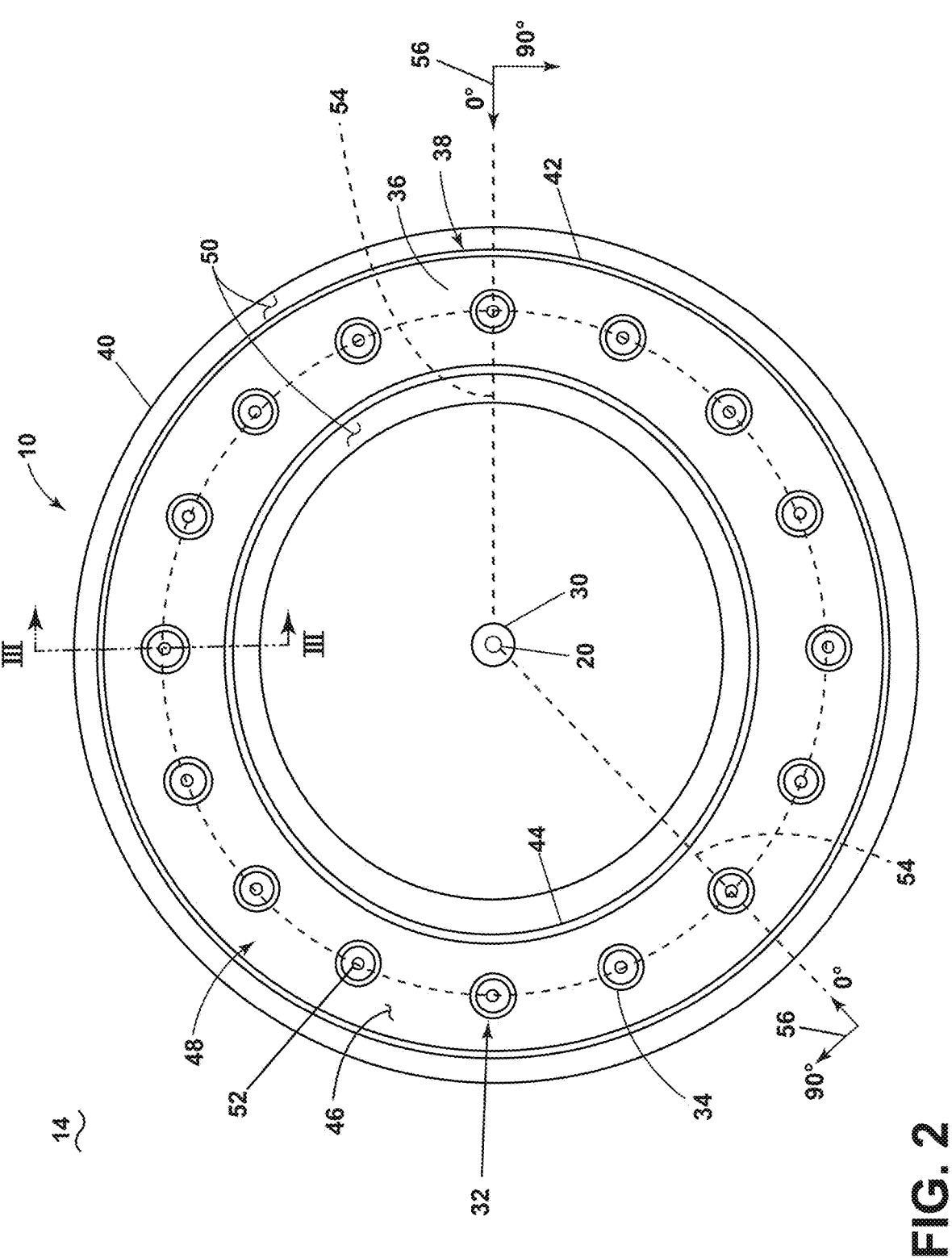
FIG. 2 is a schematic view of a combustor of the combustion section of FIG. 1 along line II-II in accordance with various aspects described herein.

FIG. 2 depicts a cross-sectional view of the combustion section 14 along line II-II of FIG. 1. The combustion section 14 can include a set of fuel cups 32 annularly arranged about a combustor centerline 30. The combustor centerline 30 can be the engine centerline 20 of the turbine engine 10. Additionally, or alternatively, the combustor centerline 30 can be a centerline for the combustion section 14, a single combustor, or a set of combustors that are arranged about the combustor centerline 30.

The set of fuel cups 32 are arranged about the combustor centerline 30. A set of fuel injectors 34 define at least a portion of the set of fuel cups 32. The set of fuel cups 32 can include rich cups, lean cups, or a combination of both rich and lean cups annularly provided about the engine centerline. It should be appreciated that the annular arrangement of fuel injectors can be one or multiple fuel injectors and one or more of the fuel injectors 34 can have different characteristics. A combustor 36 is defined, at least in part, by a combustor liner 38. The combustor 36 can have a can, can-annular, or annular arrangement depending on the type of engine in which the combustor 36 is located. In a non-limiting example, the combustor 36 can have a combination arrangement as further described herein located within a casing 40 of the engine. The combustor liner 38, as illustrated by way of example, can be annular. The combustor liner 38 can include an outer combustor liner 42 and an inner combustor liner 44 concentric with respect to each other and annular about the engine centerline. The combustor liner 38 further defines the set of fuel cups 32. A dome wall 46 together with the combustor liner 38 can define a combustion chamber 48 having an annular configuration disposed about the engine centerline 20. The set of fuel cups 32 can be fluidly coupled to the combustion chamber 48. A compressed air passageway 50 can be defined at least in part by both the combustor liner 38 and the casing 40.

Each of the set of fuel cups 32 or the fuel injectors 34 can include a center body 52. As illustrated, by way of example, the center body 52 can extend along a fuel injector centerline. The fuel injector centerline or the center body 52, in combination with the combustor centerline 30, can be used to define a respective fuel cup reference line or a fuel injector reference line, illustrated as a fuel cup reference line 54 that extends radially from the combustor centerline 30 and through the corresponding fuel cup centerline or the center body 52. For the purposes of illustration, two fuel cup reference lines 54 are shown. However, it will be appreciated that each fuel injector 34 or each fuel cup 32 includes a corresponding fuel cup reference line. The fuel cup reference line 54 is used in this description to establish a local coordinate system 56 for each fuel cup 32. The local coordinate system 56 defines a 0-180-degree line lying on the corresponding fuel cup reference line 54, and a 90-270-degree line for each of the fuel cup reference lines 54. The 0 degree and 90-degree lines have been shown for convenience. Since the set of fuel cups 32 are circumferentially spaced around the combustor centerline 30 or the engine centerline 20, basing the local coordinate system 56 on the fuel cup reference line 54 is a convenient way to describe a local fuel cup of the set of fuel cups 32, while taking into account rotational shifts in the local coordinate system 56 due to the circumferential arrangement.

Figure 3:
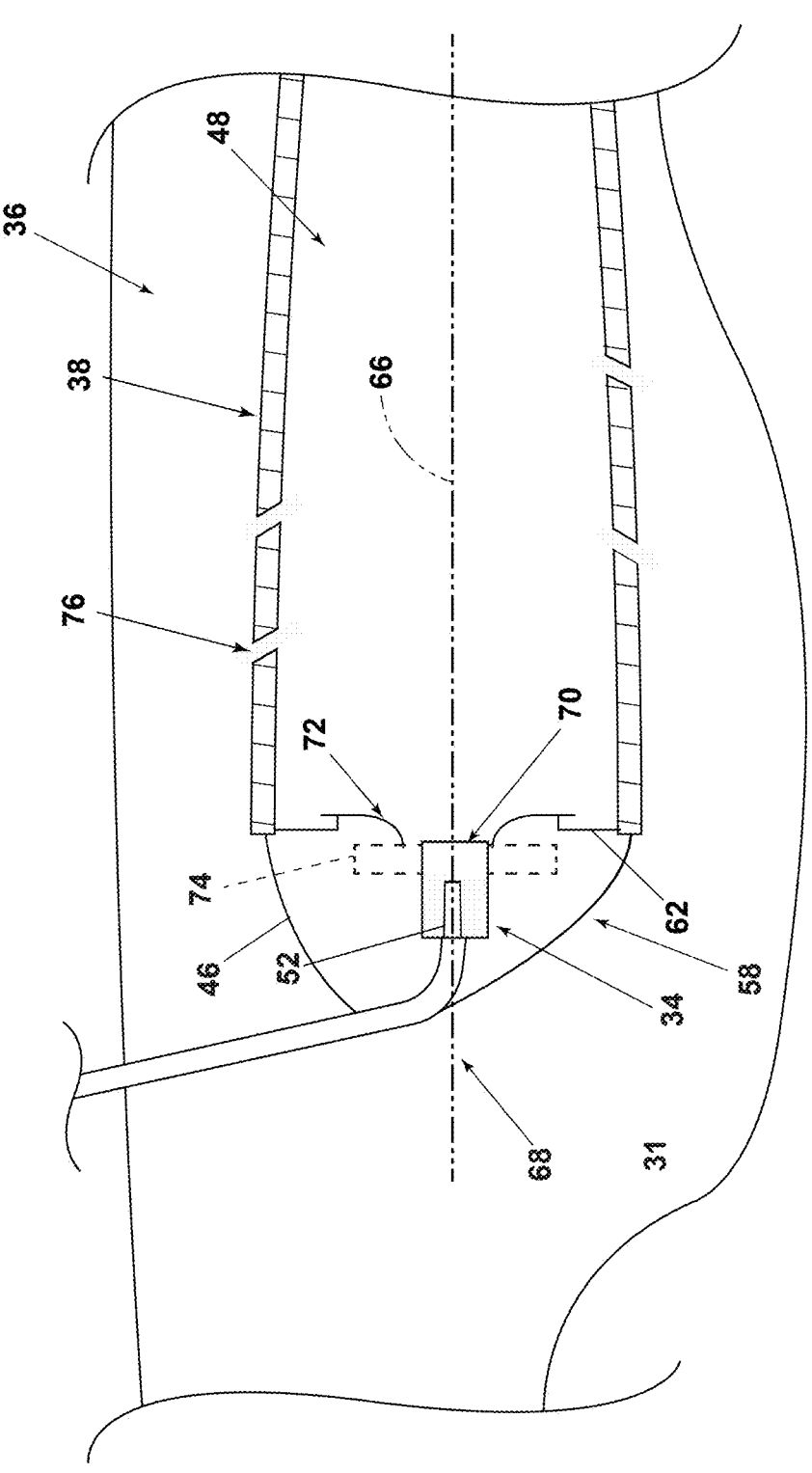
FIG. 3 is a schematic view illustrating portions of the combustor of FIG. 2 along line III-III in accordance with various aspects described herein.

FIG. 3 is a cross-sectional view taken along line III-III of FIG. 2 illustrating the combustor 36. The combustor 36 can include at least one fuel injector 34 configured to provide fuel to the combustor 36. In some examples, the fuel injector 34 can include an annular arrangement of fuel nozzles. It should be appreciated that such fuel nozzles can be organized in any suitable arrangement, pattern, grouping, or the like. Additional structural detail and examples of various possible configurations of the fuel injector 34 are detailed in FIGS. 4-10 of the disclosure.

A dome assembly 58 can include the dome wall 46 and a deflector 62. The combustor liner 38 and dome assembly 58 can collectively at least partially define the combustion chamber 48 about a longitudinal axis, illustrated as a fuel injector centerline 66. However, it is contemplated that the longitudinal axis can be a dome assembly centerline or a combustion chamber centerline, which can be concentric to the engine centerline 20.

At least one fuel supply 68 can be fluidly coupled to the combustion chamber 48 to supply fuel to the combustor 36. The fuel can include any suitable fuel, including a gaseous fuel or a liquid fuel. By way of non-limiting example, the fuel can be hydrocarbon fuel, hydrogen fuel, or a mixture of differing fuel types. The at least one fuel supply 68 can fluidly couple to the fuel injector 34 at one or more portions of the fuel injector 34, such as, but not limited to, the center body 52.

An outlet 70 of the fuel injector 34 fluidly couples the fuel injector 34 and the combustion chamber 48. The outlet 70 can provide a fuel-air mixture to the combustion chamber 48. The fuel supply 68, the dome wall 46, the fuel injector 34, or combinations thereof, can include one or more of a swirler, multiple fuel injectors, or a premixer arranged in discrete clusters or groups.

A flare cone 72 can be provided downstream of the fuel supply 68. Optionally, a swirler 74 can be provided at the fuel injector 34. While illustrated as extending radially from the fuel injector 34 and axially located at the outlet 70 (relative to the fuel injector centerline 66), the swirler 74 can be located axially anywhere along the fuel injector 34. It is contemplated that the swirler 74 can be located at least partially radially within the fuel injector 34, for example, on the center body 52, as illustrated by way of example in FIG. 10.

A set of dilution holes 76 can be provided in the combustor liner 38 and configured to direct air into the combustion chamber 48 for temperature control, flame shaping, fuel-air mixing, or the like. Any number of dilution holes can be provided in the set of dilution holes 76. The set of dilution holes 76 can have any suitable patterning or arrangement over the combustor liner 38, including linear rows, irregular groups, variable hole diameters, or the like, or combinations thereof. It is also contemplated that the combustor 36 can be formed without any dilution holes.

Figure 4:
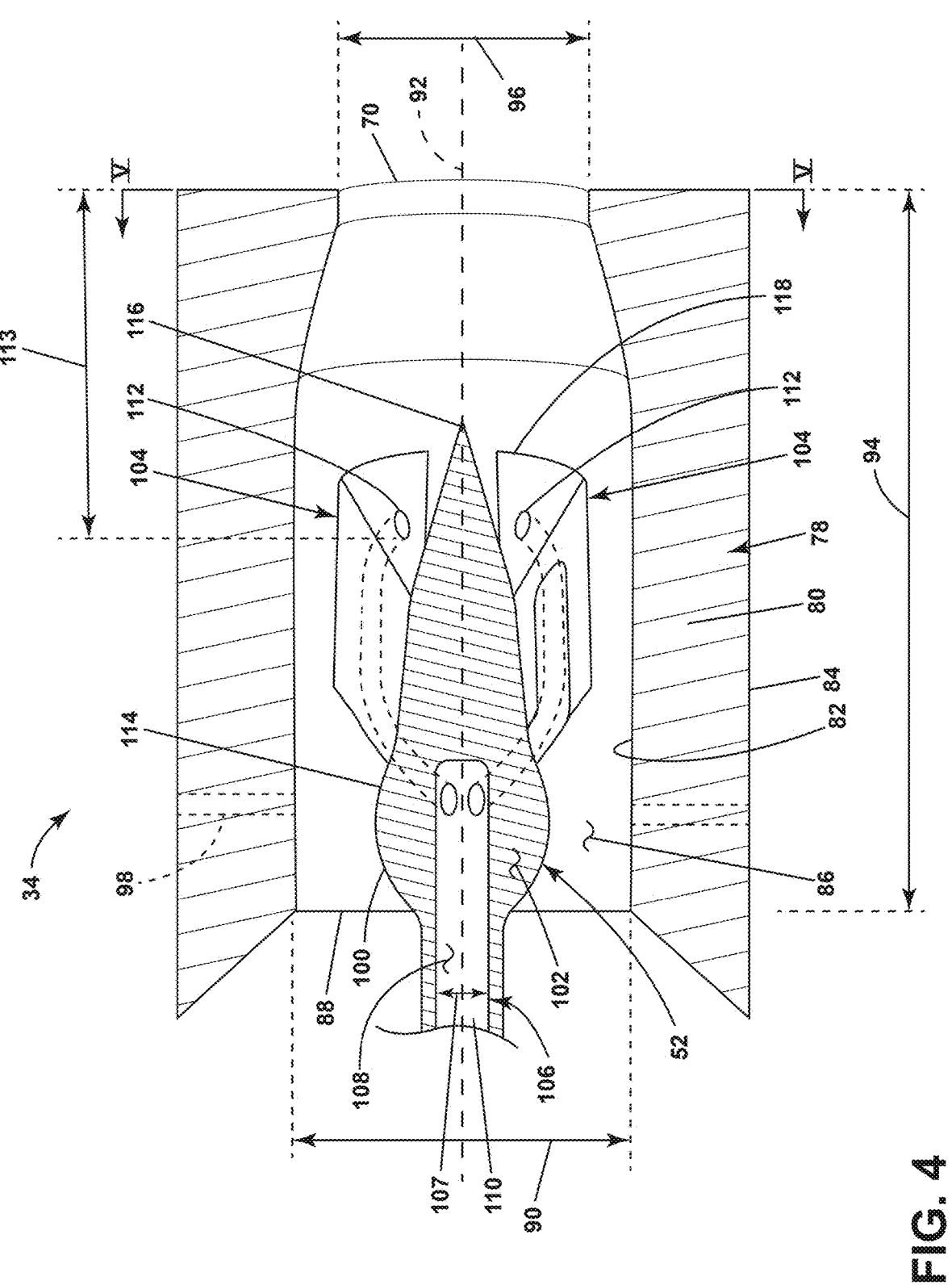
FIG. 4 is a schematic view illustrating portions of a combustor in accordance with various aspects described herein.

FIG. 4 is a detailed cross-section of an example of the fuel injector 34 that can be used in the combustor 36 (FIG. 3). The fuel injector 34 includes a body 78 and the center body 52. The body 78 includes a wall 80 with an inner surface 82 and an outer surface 84.

An air flow path 86 within the fuel injector 34 is formed by the wall 80 or the inner surface 82 of the wall 80 of the body 78. The air flow path 86 fluidly couples an inlet 88 and the outlet 70. The outlet 70 can be fluidly coupled with the combustion chamber 48 (FIG. 3). That is, the outlet 70 opens to the combustion chamber 48 (FIG. 3). The inlet 88 can receive compressed air from the compressor section 12 (FIG. 1). Additionally, or alternatively, the inlet 88 can receive air from another air supply system or portion of the turbine engine 10 (FIG. 1).

A first air flow path diameter 90 can be measured across the air flow path 86 relative to the fuel injector centerline 66 adjacent or at the inlet 88. As used herein, the term "adjacent" means within an axial distance that is 10% or less of a flow path length 94 measured from the inlet 88 to the outlet 70. That is, the first air flow path diameter 90 can be measured at the inlet 88 or at a location within the air flow path 86 that is a distance equal to or less than 10% flow path length 94 from the inlet 88.

A second air flow path diameter 96 can be measured across the air flow path 86 through the fuel injector centerline 66 adjacent or at the outlet 70. The first air flow path diameter 90 can be greater than the second air flow path diameter 96. That is, at least one or more portions of the inner surface 82 of the body 78 can narrow or converge towards the fuel injector centerline 66. The second air flow path diameter 96 can be in a range of 50% to 100% of the first air flow path diameter 90. For example, the second air flow path diameter 96 can be in a range of 75% to 95% of the first air flow path diameter 90. The decreasing diameter of the air flow path 86 increases the velocities of the fuel-air mixture prior to providing the fuel-air mixture to the combustion chamber 48 (FIG. 3). Faster velocities of the fuel-air mixture into the combustion chamber 48 (FIG. 3) reduces or eliminates flashback, flame-holding, or both.

Alternatively, in another different and non-limiting example, the first air flow path diameter 90 can be equal to or less than the second air flow path diameter 96.

Optionally, one or more air channels 98 can extend through the body 78 from the outer surface 84 to the inner surface 82. The one or more air channels 98 can fluidly couple compressed air from the compressor section 12 (FIG. 1), ambient air, or air from another air system, or combinations thereof, to the air flow path 86. While illustrated perpendicular to the fuel injector centerline 66, the one or more air channels 98 can be oriented at an angle between 0° and 90° to the fuel injector centerline 66. It is further contemplated that the one or more air channels 98 can be non-linear and curve or angle circumferentially, radially, axially, or any combination thereof.

The center body 52 is located within the air flow path 86. The center body 52 includes an exterior 100 that defines an interior 102. At least one vortex generator, illustrated by way of example, as multiple vortex generators 104, is provided on the center body 52. The multiple vortex generators 104 about the center body 52 are fluidly exposed to the air flow path 86. The multiple vortex generators 104 can be axially spaced along the center body 52, circumferentially spaced along the center body 52, or any combination thereof.

The multiple vortex generators 104 can include a counter-rotating vortex generator, a double-sided wedge, wheeler, wing, winglet, Kuethe, wishbone, hairpin, lobed, wave-type, or any combination thereof.

A fuel supply passage is illustrated, by way of example, as a fuel supply passage 106 (e.g., a gaseous fuel supply passage). The fuel supply passage 106 defines an internal fuel supply path 108. The fuel supply passage 106 is located, at least in part, within the interior 102 of the center body 52.

The fuel supply passage 106 includes a fuel inlet portion 110 fluidly coupled to the at least one fuel supply 68 (FIG. 3) and a fuel outlet on the exterior 100 of the center body 52. The fuel outlet on the exterior 100 of the center body 52 is illustrated, by way of example, as multiple fuel outlets 112, where each of the multiple vortex generators 104 have a corresponding fuel outlet of the multiple fuel outlets 112.

The multiple fuel outlets 112 are illustrated, by way of example, as located on the multiple vortex generators 104. However, it is contemplated that the fuel outlet or one or more of the multiple fuel outlets 112 can be located upstream, downstream, on one or more of the multiple vortex generators 104, or any combination thereof.

Further, the multiple fuel outlets 112 are illustrated, by way of example, as located downstream within the air flow path 86 of outlets of the one or more air channels 98. While illustrated as downstream of the one or more air channels 98, it is contemplated that at least a portion of the one or more air channels 98 can axially align with a portion of the multiple fuel outlets 112.

The fuel inlet portion 110 can have a fuel inlet diameter 107 measured across the fuel supply passage 106. The fuel inlet diameter 107 can be used to determine a cross sectional area of fuel supply passage 106.

A mixing length 113 can be a sub length or portion of the flow path length 94 in which air and fuel are mixed. The mixing length 113 can be measured from an upstream edge of one or more of the multiple fuel outlets 112 to the outlet 70.

A ratio of the mixing length 113 to second air flow path diameter 96 can be in a range from 0 to 100. For example, the ratio of the mixing length 113 to second air flow path diameter 96 can be in a range from 0 to 20. Shorter mixing lengths 113 can reduce or eliminate flashback and auto-ignition. For example, when the ratio of the mixing length 113 to second air flow path diameter 96 is in a range from 0 to 20, there is a decrease in auto-ignition when using fast burning fuels, such as, but not limited to, a hydrogen-based fuel.

By way of another example, the ratio of the mixing length 113 to the second air flow path diameter 96 can be greater than 20. The longer mixing length 113 can improve mixing.

The center body 52 can include a central spike 114 with a tip 116. The multiple vortex generators 104 can be located at the central spike 114. The multiple vortex generators 104 can include end portions 118. The end portions 118 of the multiple vortex generators 104 can be located aft or beyond the tip 116, adjacent to the tip 116, forward of the tip 116, or any combination thereof.

In operation, air is provided at the inlet 88 of the air flow path 86. Fuel from the at least one fuel supply 68 (FIG. 3) is provided at the fuel inlet portion 110. As the air flows from the inlet 88 to the outlet 70, the direction of flow of at least some of the air is altered by the multiple vortex generators 104. The altered air flow provides the desired fuel-air mixing.

The desired fuel-air mixture can have, for example, a fuel to air mass ratio of greater than or equal to 0.005 and less than or equal to 0.060. By way of further non-limiting example, for specific fuel, the desired fuel-air mixture can have a fuel to air mass ratio of greater than or equal to 0.005 and less than or equal to 0.030.

Fuel or a fuel-air mixture is provided by the multiple fuel outlets 112 to mix with the air in the air flow path 86. More specifically, the multiple fuel outlets 112 can emit fuel from the fuel supply passage 106 into the air flow path 86 for mixing the fuel with air in the air flow path 86.

While illustrated on a downstream portion of the multiple vortex generators 104, the fuel or a fuel-air mix can be provided by the multiple fuel outlets 112 upstream, downstream, at the multiple vortex generators 104, or any combination thereof. The fuel-air mix exits the fuel injector 34 at the outlet 70 and is received by the combustion chamber 48 (FIG. 3).

Optionally, it is contemplated that in addition to the multiple fuel outlets 112 and the inlet 88, supplemental air, fuel, or both can be added to the air flow path 86. One or more swirlers can be included in the air flow path 86, for example swirler 669 from FIG. 10. The one or more swirlers can be located about the center body 52 and can be located upstream, downstream, or at the multiple vortex generators 104.

The fuel injector 34 having the multiple vortex generators 104, with or without an optional swirler, can have a swirl number between 0 and 1.0. The swirl number can be the ratio of the axial flux of angular momentum to the axial flux of linear momentum of the fuel-air mixture in the air flow path 86 downstream of at least the multiple vortex generators 104.

While illustrated as having the multiple fuel outlets 112 at the multiple vortex generators 104, it is contemplated that additional fuel outlets can be provided at the center body 52, the inner surface 82, or any combination thereof. Further, any number of air channels 98 can be provided at the inner surface 82 having varying angles with respect to the fuel injector centerline 66 and varying axial locations along the flow path length 94 of the air flow path 86.

Figure 5:
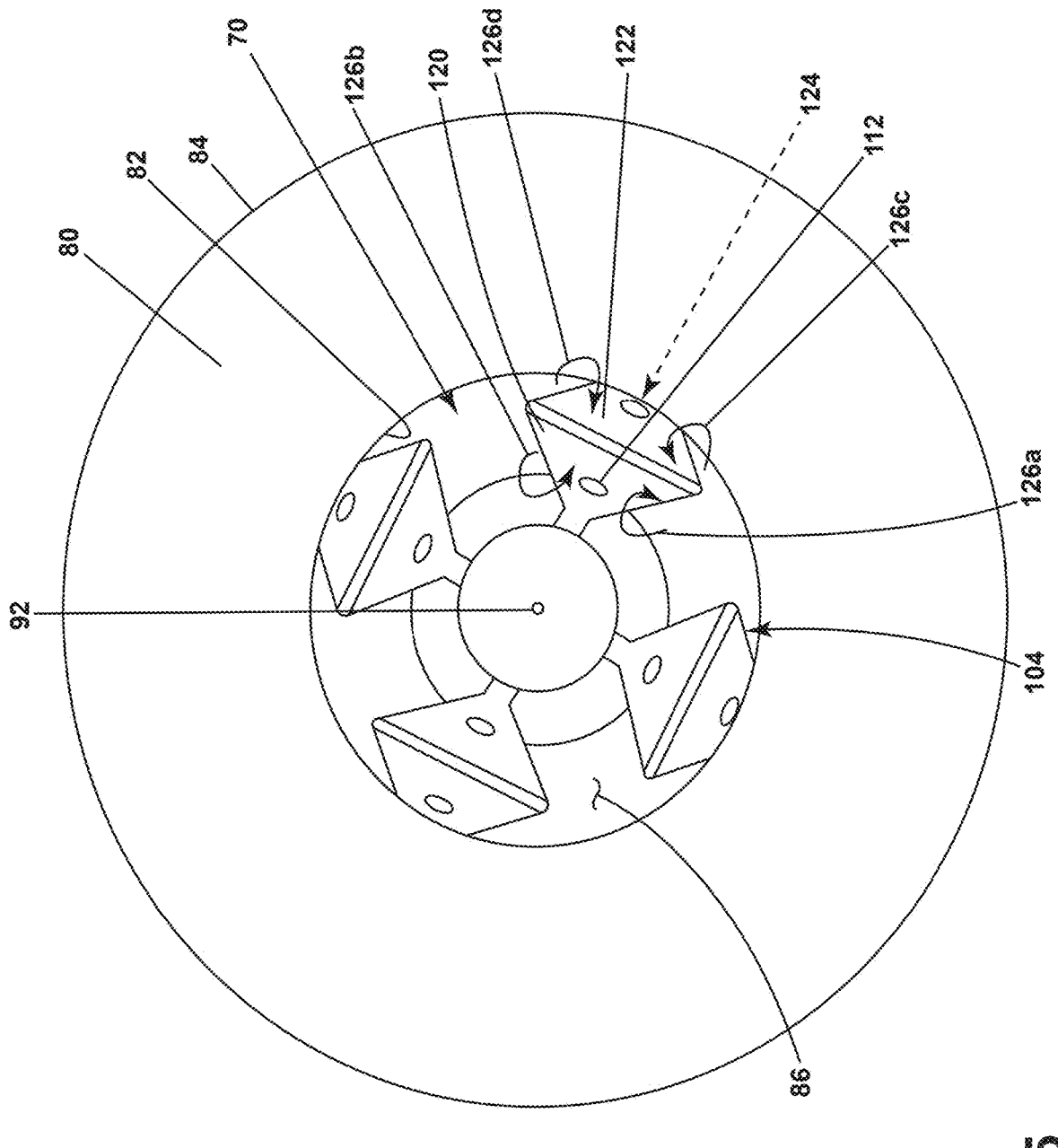
FIG. 5 is a schematic view illustrating portions of a combustor, from aft looking forward, in accordance with various aspects described herein.

FIG. 5 is a view taken at the outlet 70 and further illustrates the multiple vortex generators 104 located in the air flow path 86.

An outlet area can be defined by the outlet 70. As illustrated, by way of example, the outlet area can be the area of a circle, where the radius is measured from the fuel injector centerline 66 to the inner surface 82 of the wall 80 at the outlet 70. Alternatively, the outlet area can be any shape, where the inner surface 82 of the wall 80 at the outlet 70 can outline or circumscribe the outlet area.

A bluff body area can be determined as the area of the wall 80 at the outlet 70 between the inner surface 82 and the outer surface 84. As illustrated, by way of example, the bluff body area can be the area between two concentric circles defined by the inner surface 82 and the outer surface 84 of the wall 80 at the outlet 70. That is, the bluff body area can be the area of a first circle, where the first radius is measured from the fuel injector centerline 66 to the outer surface 84 of the wall 80 at the outlet 70, minus a second circle, where the second radius is measured from the fuel injector centerline 66 to the inner surface 82 of the wall 80 at the outlet 70. Alternatively, the bluff body area can be any shape, defined between the inner surface 82 and the outer surface 84 of the wall 80 at the outlet 70.

A ratio of the flow area (the outlet area) to the bluff body area is in a range from 0.01 to 10. For example, the ratio of the flow area (the outlet area) to the bluff body area can be in a range from 0.01 to 10. The ratio of the flow area provides flame stabilization. For example, the ratio of the flow area can be greater than 1 and less than or equal to 10. The ratio of the flow area being greater than 1 or less than or equal to 10 can reduce NOx for combustion chamber having distributed microflamelets. By way of further example, the ratio of the flow area (the outlet area) to the bluff body area can be in a range from 0.01 to 1. The ratio of the flow area to the bluff body area in the range from 0.01 to 1 can reduce weight of the turbine engine 10 (FIG. 1), allowing a fuel nozzle or injector with a lip to anchor a large flame.

A ratio of the cross-sectional area of fuel supply passage 106 determined by the fuel inlet diameter 107 (FIG. 4) to the flow area (the outlet area) can be in a range from 0.005 to 0.1. For example, the ratio of the cross-sectional area of fuel supply passage 106 can be in a range between 0.008 and 0.06. When the ratio of the cross-sectional area of fuel supply passage 106 a desired fuel efficiency and flame location can be obtained.

The air flowing through the air flow path 86 can be redirected by the multiple vortex generators 104. The multiple vortex generators 104 can have a radially inner surface 120 that defines the corresponding fuel outlet of the multiple fuel outlets 112. The multiple vortex generators 104 can also include a radially outer surface 122. It is contemplated that the radially inner surface 120 and the radially outer surface 122 can be portions of the same vortex generator or be defined by two or more vortex generators of the multiple vortex generators 104.

Optionally, one or more fuel outlets 124 can be defined by the radially outer surface 122. While illustrated as a single fuel outlet 124 for each radially outer surface 122, any number of fuel outlets can be defined by the radially outer surface 122.

The multiple vortex generators 104 are configured to direct the axial flow of compressed air provided at the inlet 88 (FIG. 4) such that the compressed air forms a vortex within the air flow path 86, illustrated, for example, as arrows 126a, 126b, 126c, 126d. The vortex can form at one or more of upstream, downstream, or at the multiple fuel outlets 112, the fuel outlets 124, or any combination thereof.

By way of example, a first subset of the arrows can be defined as arrows 126a, 126b illustrating a first rotation of the compressed air over the radially inner surface 120 in a clockwise direction. By way of example, a second subset of the arrows can be defined as arrows 126c, 126d illustrating a second rotation of the compressed air over the radially outer surface 122 in a counter-clockwise direction.

Figure 6:
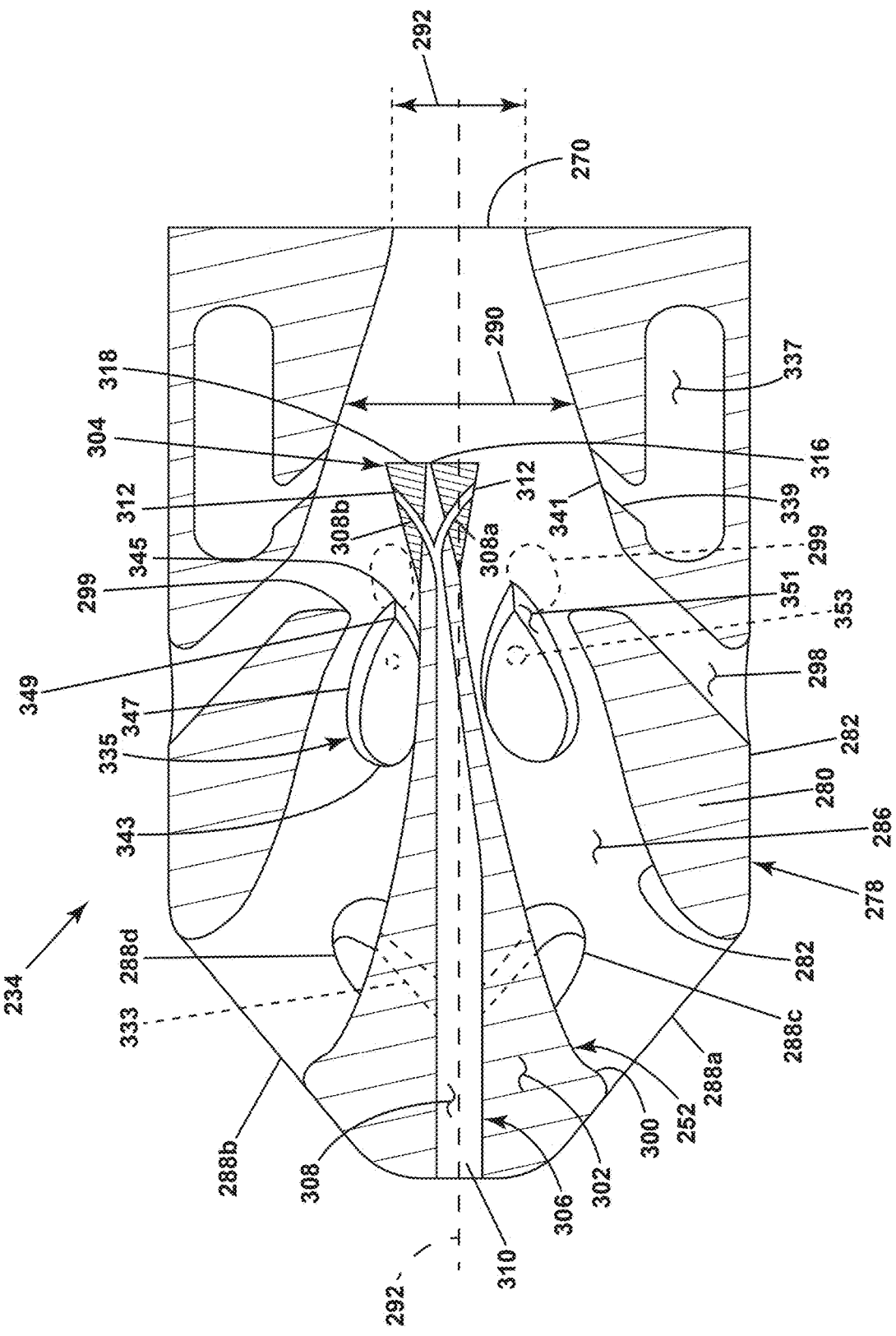
FIG. 6 is another schematic view illustrating portions of a combustor in accordance with various aspects described herein.

FIG. 6 is a variation of a portion of the cross-section view of FIG. 4, wherein FIG. 6 illustrates a fuel injector 234 that can be used in the combustor 36 (FIG. 3).

The fuel injector 234 is similar to the fuel injector 34, therefore, like parts will be identified with like numerals increased by two hundred (200), with it being understood that the description of the like parts of the fuel injector 34 applies to the fuel injector 234, unless otherwise noted.

The fuel injector 234 includes a body 278 and a center body 252. The body 278 includes a wall 280 with an inner surface 282 and an outer surface 284.

An air flow path 286 within the fuel injector 234 is formed by the wall 280 or the inner surface 282 of the wall 280 of the body 278. The air flow path 286 fluidly couples air inlets 288a, 288b, 288c, 288d and an outlet 270. The outlet 270 can be fluidly coupled with the combustion chamber 48 (FIG. 3). That is, the outlet 270 can open to the combustion chamber 48 (FIG. 3). The inlets 288a, 228b, 288c, 288d can receive compressed air from the compressor section 12

(FIG. 1). Additionally, or alternatively, one or more of the inlets 288a, 228b, 288c, 288d can receive air from another air supply system or portion of the turbine engine 10 (FIG. 1).

A first air flow path diameter 290 can be measured across the air flow path 286 relative to a fuel injector centerline 266 upstream of the outlet 270. A second air flow path diameter 296 can be measured across the air flow path 286 through the fuel injector centerline 266 adjacent or at the outlet 270. The first air flow path diameter 290 can be greater than the second air flow path diameter 296. That is, at least one or more portions of the inner surface 282 of the body 278 can narrow or converge towards the fuel injector centerline 266. The decreasing diameter of the air flow path 286 increases the velocities of the fuel-air mixture prior to providing the fuel-air mixture to the combustion chamber 48 (FIG. 3). Faster velocities of the fuel-air mixture into the combustion chamber 48 (FIG. 3) reduces or eliminates flashback, flame-holding, or both.

One or more air channels 298 can extend through the body 278 from the outer surface 284 to the inner surface 282. The one or more air channels 298 can fluidly couple compressed air from the compressor section 12 (FIG. 1), ambient air, or air from another air system to the air flow path 286.

While the one or more air channels 298 are illustrated as having a centerline angled with respect to the fuel injector centerline 266, the one or more air channels 298 can be orientated so that the centerline forms an angle greater than 0° and less than or equal to 90° relative to the fuel injector centerline 266. It is further contemplated that the one or more air channels 298 can have a non-linear centerline that curves circumferentially, radially, axially, or any combination thereof. The one or more air channels 298 include a set of air outlets 299 exhausting into the air flow path 286. The one or more air channels 298 can include any number of one or more channels, holes, slots, or a combination thereof and can be circumferentially spaced on the inner surface 282 of the wall 280. It is yet further contemplated that the one or more air channels 298 can include multiple axially spaced rows of air channels.

The center body 252 is located within the air flow path 286. The center body 252 includes an exterior 300 that defines an interior 302. At least one vortex generator, illustrated by way of example, as multiple vortex generators 304 are provided on the center body 252. The multiple vortex generators 304 are fluidly exposed to the air flow path 286. The multiple vortex generators 304 can be axially spaced along the center body 252, circumferentially spaced along the center body 252, or any combination thereof.

The center body 252 can include a central spike 314 with a tip 316. The multiple vortex generators 304 can circumscribe the central spike 314. The multiple vortex generators 304 can include end portions 318. The end portion 318 are illustrated, by way of example, as axially located at the tip 316. That is, one or more of the multiple vortex generators 304 can be located on the tip 316 of the central spike 314.

Alternatively, in a different and non-limiting example, each vortex generator of the multiple vortex generators 304 can be located adjacent to the tip 316, at the tip 316, forward of the tip 316, or any combination thereof.

At least one fuel supply passage is illustrated, by way of example, as a fuel supply passage 306 (e.g., a gaseous fuel supply passage). The fuel supply passage 306 defines an internal fuel supply path 308. The fuel supply passage 306 is located, at least in part, within the interior 302 of the center body 352.

The fuel supply passage 306 includes a fuel inlet portion 310 fluidly coupled to the at least one fuel supply 68 (FIG. 3) and a fuel outlet on the exterior 300 of the center body 252. The fuel outlet on the exterior 300 of the center body 252 is illustrated, by way of example, as multiple fuel outlets 312, where each of the multiple vortex generators 304 have a corresponding gaseous fuel outlet of the multiple fuel outlets 312.

The internal fuel supply path 308 can include branches illustrated as multiple branches 308a, 308b, where each branch of the multiple branches 308a, 308b corresponds a fuel outlet of the multiple fuel outlets 312.

The multiple fuel outlets 312 are illustrated, by way of example, as located on the multiple vortex generators 304. However, it is contemplated that the fuel outlet or one or more of the multiple fuel outlets 312 can be located upstream, downstream, or on one or more of the multiple vortex generators 304, or any combination thereof.

Further, the multiple fuel outlets 312 are illustrated, by way of example, as located downstream within the air flow path 286 of outlets of the one or more air channels 298. While illustrated as downstream of the one or more air channels 298, it is contemplated that at least a portion of the one or more air channels 298 can axially align with a portion of the multiple fuel outlets 312.

Optionally, one or more fuel outlets 333 can be located on the center body 252 in addition to the multiple fuel outlets 312 or, in a different and non-limiting example, in place of the multiple fuel outlets 312. The fuel outlets 333 can fluidly couple the internal fuel supply path 308 with the air flow path 286. That is, the fuel outlets 333 can be located at the exterior 300 of the center body 252 upstream of the multiple vortex generators 304, downstream of the multiple vortex generators 304, or any combination thereof. It is also contemplated in a different and non-limiting example that additional vortex generators on the center body 252 can be placed in addition to or in place of the multiple vortex generators 304.

At least one outer vortex generator, illustrated as a set of outer vortex generators 335, can extend from the inner surface 282 of the wall 280. The set of outer vortex generators 335 are fluidly exposed to the air flow path 286.

Each outer vortex generator of the set of outer vortex generators 335 can include a leading edge 343, a trailing edge 345, a root 347, an apex 349, and a face 351. The root 347 extends along the inner surface 282. The face 351 is defined as where the root 347 rises to meet the apex 349.

Each outer vortex generator of the set of outer vortex generators 335 can be integrally formed with or coupled (e.g., through welding, adhesion, bonding, fastening, or the like) to the inner surface 282 of the wall 280. As a non-limiting example, each outer vortex generator of the set of outer vortex generators 335 can be integrally formed with the wall 280, and the root 347 can be defined as a transition from the inner surface 282 to the outer vortex generator.

Each outer vortex generator of the set of outer vortex generators 335 can include a respective cross-sectional area when viewed along a plane extending along the fuel injector centerline 266 and intersecting the face 351. The cross-sectional area of each outer vortex generator of the set of outer vortex generators 335 can include any suitable shape such as, but not limited to, a triangle, a semi-circle, a semi-ellipse, a rectangle, a trapezoid, or the like.

While illustrated as the set of outer vortex generators 335 circumferentially spaced along the inner surface 282, any number of outer vortex generators can be circumferentially spaced, axially spaced, radially spaced, or any combination thereof.

The set of outer vortex generators 335 can be located at or upstream of the example, such as at or upstream of the set of air outlets 299 of the one or more air channels 298. However, it is contemplated in a different and non-limiting example, that the set of outer vortex generators 335 can be located downstream of the set of air outlets 299.

The outer vortex generators 335 can be located downstream of the fuel outlets 333. Optionally, one or more of the outer vortex generators 335 can include a fuel outlet 353. While illustrated on a top surface of the set of outer vortex generators 335, it is contemplated that the fuel outlet 353 can be located on the face 351. It is further contemplated that each outer vortex generator of the set of outer vortex generators 335 can include several fuel outlets 353 on one or more of the top surface or the face 351.

A fuel manifold 337 can be provided within the wall 280. A set of fuel channels 339 are at least partially formed within the wall 280. The set of fuel channels 339 fluidly couple the fuel manifold 337 and the air flow path 286. The set of fuel channels 339 can provide fuel to the air flow path at a set of fuel outlets 341. The set of fuel outlets 341 can include any number of one or more channels, holes, slots, or a combination thereof circumferentially spaced along the inner surface 282 of the wall 280, with respect to the fuel injector centerline 266. Each fuel channel of the set of fuel channels 339 includes a respective fuel channel centerline. The fuel channel centerline is illustrated, by way of example, as angled with respect to the fuel injector centerline 266. However, it is contemplated that the fuel channel centerline, the set of fuel channels 339 can be orientated so that the fuel channel centerline forms an angle between 0° and 90° to the fuel injector centerline 266. It is further contemplated that the set of fuel channels 399 can have a non-linear centerline that curves circumferentially, radially, axially, or any combination thereof.

While illustrated as downstream of the set of air outlets 299 of the one or more air channels 298, it is contemplated that the fuel manifold 337 can be upstream of the set of air outlets 299. It is further contemplated that the axial location (e.g., downstream or upstream) along the fuel injector centerline 266 of the set of air outlets 299, the set of fuel outlets 341, the multiple fuel outlets 312, and the set of outer vortex generators 335 can vary. That is, from upstream to downstream, all orders of the set of air outlets 299, the set of fuel outlets 341, the multiple fuel outlets 312, and the set of outer vortex generators 335 are contemplated.

By way of non-limiting example, the one or more of the set of fuel channels 339, one or more of the multiple branches 308a, 308b, or one or more of the fuel outlets 333 on the center body 252, or any combination therefore can provide one or more of hydrogen, natural gas, diesel, Jet-A, water, air, or any combination thereof to the air flow path 286.

By way of further non-limiting example, fuel provided via the multiple branches 308a, 308b or one or more of the fuel outlets 333 located at the center body 252 could be a different fuel than that provided via the set of fuel channels 339 located at the inner surface 282, which can enable the fuel from the center body 252 to act as a pilot for use on the different type of fuel provided radially outward at the inner surface 282 via the set of fuel channels 339.

Figure 7:
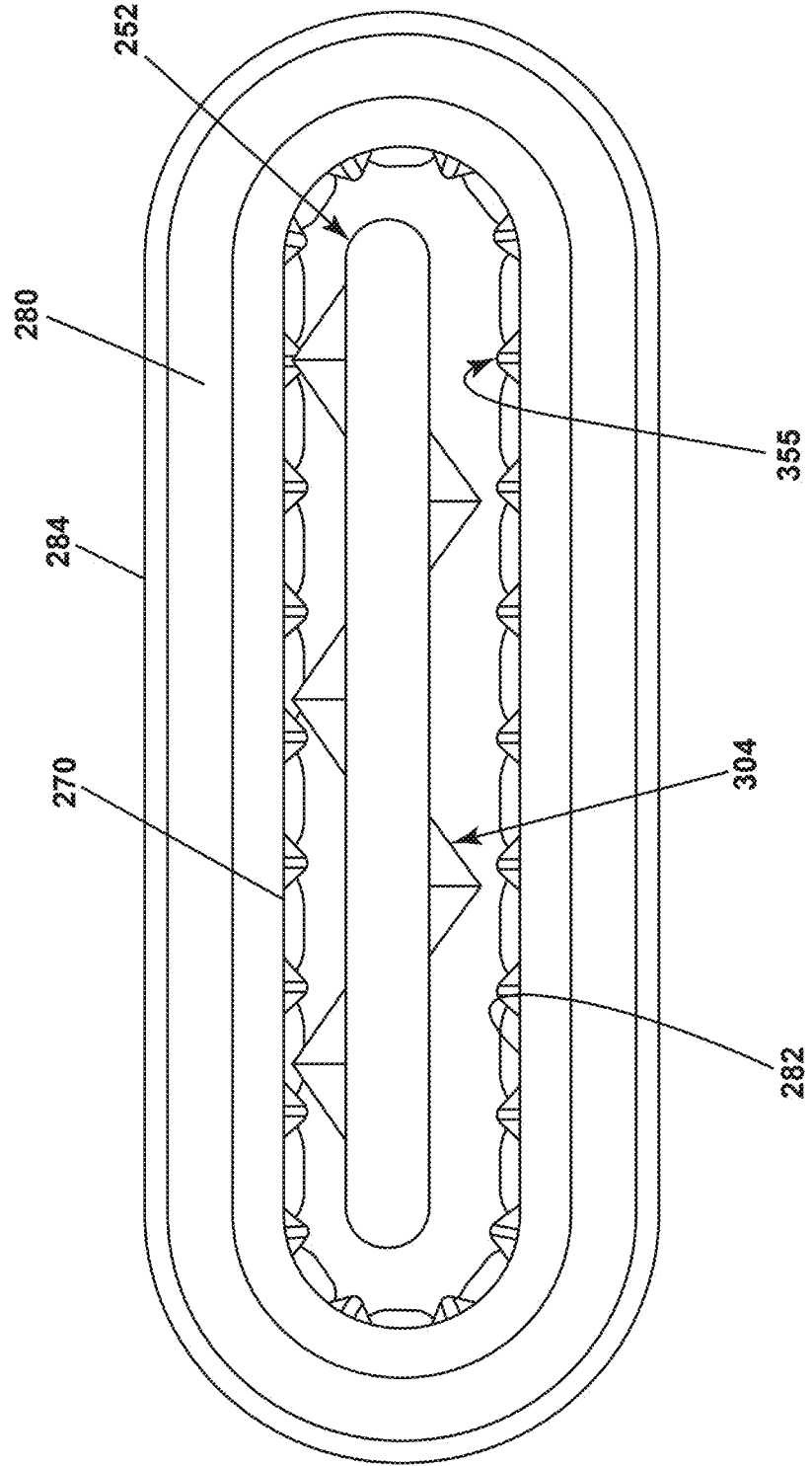
FIG. 7 is a schematic view illustrating portions of the combustor of FIG. 6, from forward looking aft, in accordance with various aspects described herein.

FIG. 7 is a view taken at the outlet 270 of FIG. 6 looking towards the center body 252. The outlet 270 is illustrated as having a stadium or racetrack shape, however any shape is contemplated.

An outlet area or flow area can be defined by the outlet 270. As illustrated, by way of example, the outlet area can be the shape of a stadium or rounded rectangle.

A bluff body area can be determined as the area of the wall 280 at the outlet 270 between the inner surface 282 and the outer surface 284. As illustrated, by way of example, the bluff body area can be the area between two concentric stadiums defined by the inner surface 282 and the outer surface 284 of the wall 280 at the outlet 270.

A ratio of the flow area (the outlet area) to the bluff body area is in a range from 0.01 to 10. The ratio of the flow area provides space for the flame to anchor while accommodating requirements of different sized arrays or varying number of fuel injectors. For example, the ratio of the flow area can be greater than 1 and less than or equal to 10. The ratio of the flow area being greater than 1 or less than or equal to 10 can reduce NOx for combustion chamber having distributed microflamelets. By way of further example, the ratio of the flow area (the outlet area) to the bluff body area can be in a range from 0.01 to 1. The ratio of the flow area to the bluff body area in the range from 0.01 to 1 can reduce weight of the turbine engine 10 (FIG. 1), allowing a fuel nozzle or injector with a lip to anchor a large flame.

The air flowing through the air flow path 286 can be redirected by the multiple vortex generators 304 formed with or coupled to the center body 252. The multiple vortex generators 304 are configured to direct the axial flow of compressed air provided to the inlet 288 such that the compressed air forms a vortex within the air flow path 286. The set of outer vortex generators 355 provide additional redirection to the compressed air flowing through the air flow path 286.

The vortices generated by the multiple vortex generators 304, the set of outer vortex generators 355, or both the multiple vortex generators 304 and the set of outer vortex generators 355 improves the mixture of the compressed air with gaseous fuel in the air flow path 286 upstream of the combustion chamber 48 (FIG. 3). That is, the multiple vortex generators 304, the set of outer vortex generators 355, or both the multiple vortex generators 304 and the set of outer vortex generators 355 can result in a fuel injector swirl number in a range from 0 to 1.0. By way of non-limiting example, the fuel injector 234 can be a low swirl injector, where the fuel injector swirl number is less than 0.5. Low swirl injectors can have an increased effective area of mixing.

Figure 8:
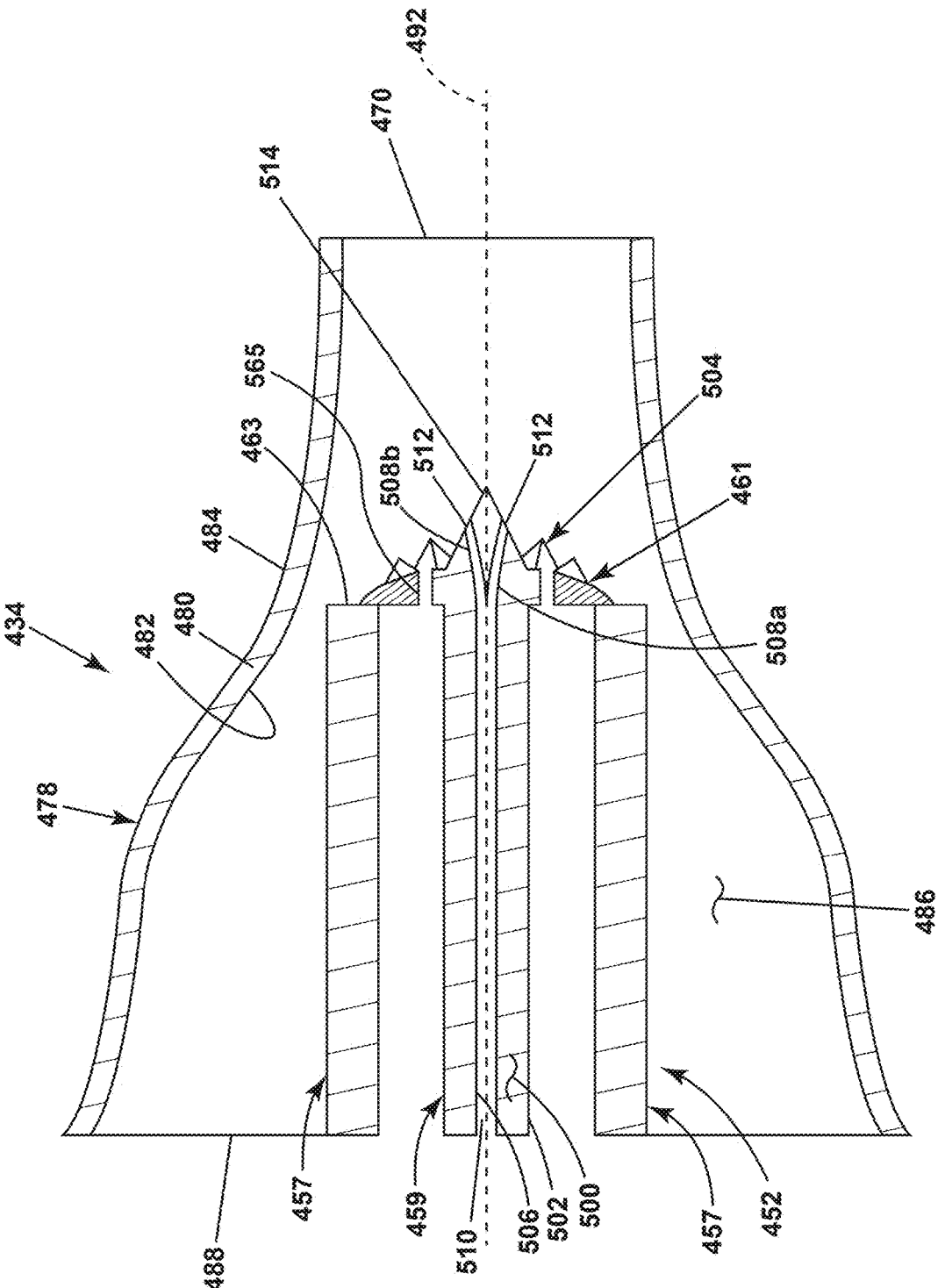
FIG. 8 is yet another schematic view illustrating portions of a combustor in accordance with various aspects described herein.

FIG. 8 is another variation of the cross-section view of FIG. 4, wherein FIG. 8 illustrates a fuel injector 434 that can be used in the combustor 36 (FIG. 3).

The fuel injector 434 is similar to the fuel injector 34 and the fuel injector 234, therefore, like parts will be identified with like numerals further increased by two hundred (200), with it being understood that the description of the like parts of the fuel injector 34, 234 applies to the fuel injector 434, unless otherwise noted.

The fuel injector 434 includes a body 478 and a center body 453. The body 478 includes a wall 480 with an inner surface 482 and an outer surface 484.

An air flow path 486 within the fuel injector 434 is formed by the wall 480 or the inner surface 482 of the wall 480 of the body 478. The air flow path 486 fluidly couples an inlet 488 and an outlet 470. The outlet 470 can be fluidly coupled with the combustion chamber 48 (FIG. 3).

The center body 453 is located within the air flow path 486. The center body 453 includes support structures 457 circumferentially spaced about a middle structure 459 and a platform 461 formed with or coupled to the support structures 457 and the middle structure 459. The support structures 457 and the middle structure 459 can be one or more of a post, strut, protrusion, tube, extension, or the like.

The middle structure 459 includes an exterior 500 that defines an interior 502. The at least one fuel supply passage is illustrated, by way of example, as a fuel supply passage 506 (e.g., a gaseous fuel supply passage). The fuel supply passage 506 is located, at least in part, within the interior 502 of the middle structure 459 of the center body 453.

The platform 461 can be formed with the middle structure 459 and extend radially outward towards the inner surface 482. The platform 461 couples to axial ends 463 of the support structures 457.

At least one vortex generator, illustrated by way of example, as multiple vortex generators 504 are provided on the platform 461 of the center body 453. The multiple vortex generators 504 extending from the platform 461 can circumscribe a central spike 514 of the middle structure 459 of the center body 453. It is contemplated, in a different and non-liming example, that the multiple vortex generators 504 can be defined by a recessed pattern in the platform 461. That is, the multiple vortex generators 504 can be formed within the platform 461 instead of extending from the platform 461.

One or more air passages 565 can extend through the platform 461. The one or more air passages 565 are illustrated as having a centerline parallel or in the same direction as a fuel injector centerline 466. However, it is contemplated that the one or more air passages 565 can be orientated so that the centerline forms an angle between 0° and 90° to the fuel injector centerline 466. It is further contemplated that the one or more air passages 565 can have a non-linear centerline that curves or angles circumferentially, radially, axially, or any combination thereof.

The fuel supply passage 506 includes a fuel inlet portion 510 fluidly coupled to the at least one fuel supply 68 (FIG. 3) and includes multiple fuel outlets 512 circumferentially spaced about the central spike 514. The fuel supply passage 506 can include branches illustrated as multiple branches 508a, 508b where each branch of the multiple branches 508a, 508b corresponds a fuel outlet of the multiple fuel outlets 512. The multiple fuel outlets 512 are illustrated, by way of example, as located on the central spike 514, however, it is contemplated that the fuel outlet or one or more of the multiple fuel outlets 512 can be located at the multiple vortex generators 504.

Figure 9:
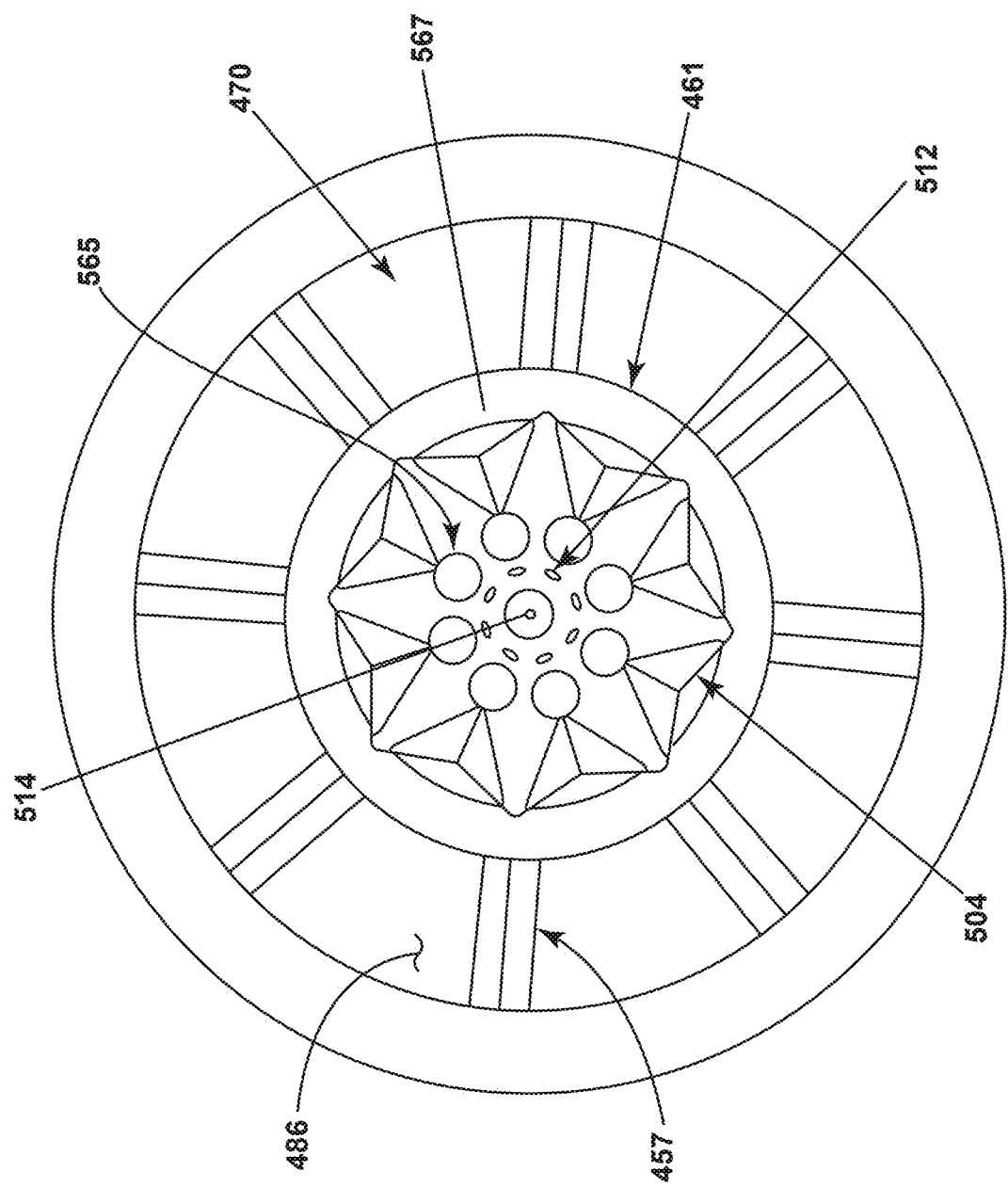
FIG. 9 is a schematic view illustrating portions of the combustor of FIG. 8, from forward looking aft, and from aft looking forward, respectively, in accordance with various aspects described herein.

FIG. 9 is a view taken at the outlet 470 of FIG. 8 and further illustrates the center body 453 having the multiple vortex generators 504. The multiple vortex generators 504 are illustrated as circumscribed by a domed portion 567 the platform 461. Each fuel outlet of the multiple fuel outlets 512 can be circumferentially spaced about the central spike 514 and can be axially aligned, as illustrated by way of example, with an air passage of the one or more air passages 565. It is contemplated, in a different and non-limiting example, that the number of the multiple fuel outlets 512 and the one or more air passages 565 can vary and be offset axially.

While illustrated as having eight support structures 457, which is equal to the number the multiple fuel outlets 512, any number of support structures are contemplated, wherein the number if support structures 457 can be equal to, greater than, or less than the number of fuel outlets in the multiple fuel outlets 512.

The air flowing through the air flow path 486 can pass through the platform 461 and be redirected by the multiple vortex generators 504 upstream of the multiple fuel outlets 512.

Figure 10:
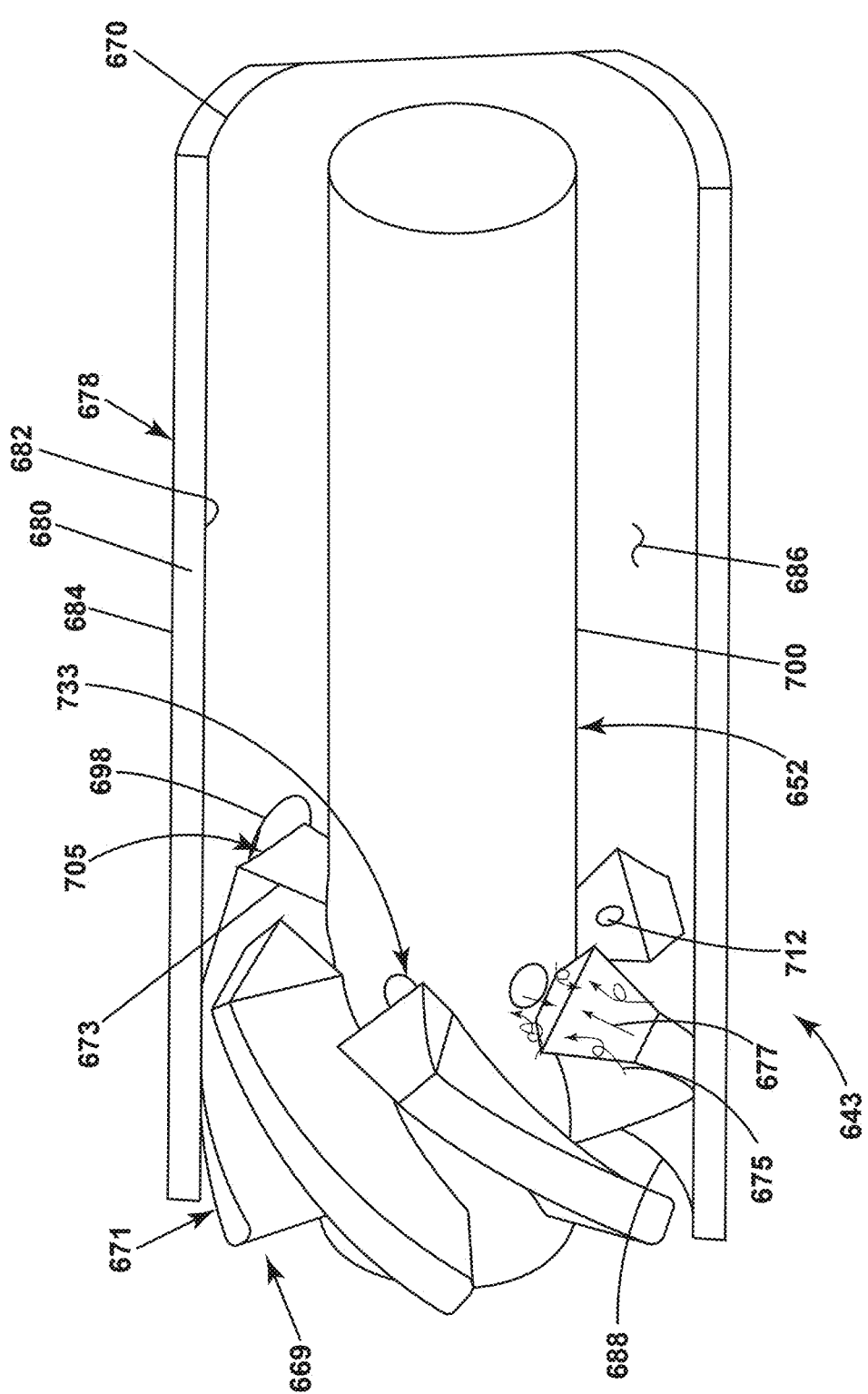
FIG. 10 is still yet another schematic view illustrating portions of a combustor in accordance with various aspects described herein.

FIG. 10 is yet another variation of the cross-section view of FIG. 4, wherein FIG. 10 illustrates a fuel injector 634 that can be used in the combustor 36 (FIG. 3).

The fuel injector 634 is similar to the fuel injectors 34, 234, 434, therefore, like parts will be identified with like numerals further increased by two hundred (200), with it being understood that the description of the like parts of the fuel injectors 34, 234, 434 applies to the fuel injector 634, unless otherwise noted.

The fuel injector 634 includes a body 678 and a center body 652. The body 678 includes a wall 680 with an inner surface 682 and an outer surface 684.

An air flow path 686 within the fuel injector 634 is formed by the wall 680 or the inner surface 682 of the wall 680 of the body 678. The air flow path 686 fluidly couples an inlet 688 and an outlet 670. The outlet 670 can be fluidly coupled with the combustion chamber 48 (FIG. 3).

One or more air channels 698 can extend through the body 678 from the outer surface 684 to the inner surface 682. The one or more air channels 698 can be fluidly coupled to compressed air from the compressor section 12 (FIG. 1), ambient air, air from another air system to the air flow path 686, or any combination thereof.

The center body 652 is located within the air flow path 686. A swirler 669 is located about the center body 652. The swirler 669 can be an annular swirler located within the interior of the body 678 in the air flow path 686. The swirler 669 can include at least one vane, illustrated as a plurality of static vanes 671. At least one vane of the plurality of static vanes 671 terminates in a tip 673. At least one vortex generator of multiple vortex generators 705 is located at the tip 673 of the at least one vane of the plurality of static vanes 671. Further, as illustrated, each vane of the plurality of static vanes 671 can include a respective vortex generator of the multiple vortex generators 705 located at the tip 673.

Outlets 733 can be located on the center body 652 in addition to the multiple fuel outlets 712 or, in a different and non-limiting example, in place of the multiple fuel outlets 712. The outlets 733 can fluidly couple an internal fuel supply path with the air flow path 686. That is, the outlets 733 can be located at an exterior 700 of the center body 652 downstream or axially aligned with a portion of the swirler 669.

Additionally, or alternatively, the outlets 733 fluidly couple an internal air supply passage within the center body 652 to the air flow path 686. The outlets 733, when coupled to the internal air supply, are located upstream of the multiple fuel outlets 712. While illustrated as upstream, it is contemplated, in a different and non-limiting example that the outlets 733 can be downstream or axially align with a portion of the multiple fuel outlets 712.

The swirler 669 can be configured to swirl compressed air provided via the inlet 688, the one or more air channels 698, or both, in proximity to fuel exiting the at least one fuel supply 68 (FIG. 3). That is, the swirler 669 can swirl air in the air flow path 686 at or upstream of the multiple fuel outlets 712, the outlets 733, or any combination thereof. The swirler 669 can increase the swirl number of the fuel-air mixture provided at the outlet 670 to the combustion chamber 48 (FIG. 3).

The swirler 699 can provide a twisting or swirling air flow 675. The multiple vortex generators 704 axially change the direction of the swirling air flow 675, a non-swirling air 677, or any combination thereof to form vortices within the air flow path 686.

With some aspects, the disclosed combustors can be utilized with liquid fuels or gaseous fuels, such as hydrogen. Gaseous fuel, including hydrogen, spreads/disperses at a faster rate than atomized liquid fuel, which can involve less mixing time for the gaseous fuel and the flame from the gaseous fuel may be more likely to spread farther and faster, which can increase the risk of flashback and increase the impact of controlling the flame and limiting flame spread by controlling the dispersion of the gaseous fuel. Flame shaping formations, such as air tubes and flame shaping holes, can help contain gaseous fuel-air mixtures that have lower densities and higher velocities than with liquid fuels. For example, flame shaping formations can contain the gaseous fuel-air mixtures such that the flame velocity matches the flow velocity to provide a stable flame.

The fuel injectors as disclosed herein provide improved mixing of the air and fuel, understanding that the fuel can be a gaseous fuel, such as hydrogen or a traditional fuel, such as kerosine (e.g. Jet A), diesel, natural gas, methane, ammonia or can include a combination of fuels. The improved mixing can generate a more uniform flame. A more uniform flame can be easier to shape and control, improving burn and efficiency. Further, aspects described herein relating to the fuel injectors can provide the fuel-air mixture to the combustion chamber at an increased velocity. When the flame velocity matches the flow velocity of the fuel-air mixture, the flame has increased stability. Therefore, faster exit speeds of the fuel-air mixture from the air flow path to the combustion chamber allow for a more stable flame for a faster burning fuel, such as a gaseous fuel.

Further aspects are provided by the subject matter of the following clauses:

A turbine engine comprising a compressor section, a combustion section including a combustor, and a turbine section in serial flow arrangement, the combustor comprising a combustion chamber, a fuel injector having a body with a wall forming an air flow path with an outlet open to the combustion chamber, a center body located within the air flow path and having an internal fuel supply path, a vortex generator provided on the center body and fluidly exposed to the air flow path, and at least one fuel supply passage having a fuel outlet on an exterior of the center body and emitting fuel into the air flow path for mixing the fuel with air in the air flow path.

The turbine engine of the preceding clause, wherein the fuel outlet is located at least one of upstream, downstream, or on the vortex generator.

The turbine engine of any preceding clause, where in the vortex generator has a face and the fuel outlet is located on the face.

The turbine engine of any preceding clause, wherein the vortex generator comprises multiple vortex generators.

The turbine engine of any preceding clause, wherein each of the multiple vortex generators have a corresponding fuel outlet.

The turbine engine of any preceding clause, wherein the multiple vortex generators are at least one of axially spaced along the center body or circumferentially spaced along the center body.

The turbine engine of any preceding clause, wherein the vortex generator is a counter-rotating vortex generator.

The turbine engine of any preceding clause, wherein the at vortex generator is a double-sided wedge, wheeler, wing, winglet, Kuethe, wishbone, hairpin, or wave-type.

The turbine engine of any preceding clause, further comprising a swirler located about the center body.

The turbine engine of any preceding clause, wherein the vortex generator is located on the swirler.

The turbine engine of any preceding clause, wherein the swirler comprises at least one vane terminating in a tip and the vortex generator is located at the tip.

The turbine engine of any preceding clause, wherein the fuel outlet is located at the tip.

The turbine engine of any preceding clause, wherein the center body includes a central spike, and the vortex generator is located at the central spike.

The turbine engine of any preceding clause, wherein the vortex generator is a plurality of vortex generators circumscribing the central spike.

The turbine engine of any preceding clause, wherein the vortex generator is located on a tip of the central spike.

The turbine engine of any preceding clause, further comprising an outer vortex generator located on an inner surface of the wall of the body.

The turbine engine of any preceding clause, wherein the outer vortex generator is located upstream of the vortex generator provided on the center body.

The turbine engine of any preceding clause, wherein the outer vortex generator is located upstream of the fuel outlet.

The turbine engine of any preceding clause, further comprising a fuel manifold defined by a portion of the body, wherein a set of fuel channels fluidly couple the fuel manifold to the air flow path.

The turbine engine of any preceding clause, further comprising a set of air outlets extending through the wall of the body, wherein the set of air outlets are located upstream of the set of fuel channels.

The turbine engine of any preceding clause, wherein the at least one fuel supply passage is at least one gaseous fuel supply passage, wherein the fuel outlet on the exterior of the center body emits gaseous fuel into the air flow path for mixing the gaseous fuel with air in the air flow path.

The turbine engine of any preceding clause, wherein the center body further comprises an internal air supply passage having an internal air supply outlet on the center body.

The turbine engine of any preceding clause, wherein the internal air supply outlet is located upstream of the fuel outlet.

The turbine engine of any preceding clause, further comprising a set of air outlets extending through the wall of the body, wherein the set of air outlets are located downstream of the set of fuel channels.

While described with respect to a turbine engine, it should be appreciated that the combustor as described herein can be for any engine with a having a combustor. It should be appreciated that application of aspects of the disclosure discussed herein are applicable to engines with propeller sections or fan and booster sections along with turbojets, turbo engines, and turboshaft engines in aviation, marine, and stationary applications as well.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. By way of non-limiting example, the center bodies of FIG. 4, FIG. 6, and FIG. 8 can optionally further include a swirler. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
a compressor section, a combustion section including a combustor, and a turbine section in serial flow arrangement, the combustor comprising:
a combustion chamber;
a fuel injector having a body with a wall having an annular inner surface, wherein the annular inner surface of the wall forms an air flow path fluidly coupling an inlet with an outlet open to the combustion chamber;
a center body located within the air flow path and having an internal fuel supply path, wherein the center body converges to a tip at a downstream end of the center body;
a vortex generator provided on the center body downstream of the inlet and fluidly exposed to the air flow path, wherein the vortex generator and the center body are spaced from the annular inner surface of the wall; and
at least one fuel supply passage having a fuel outlet emitting fuel into the air flow path for mixing the fuel with air in the air flow path;
wherein the vortex generator has a radially outer surface that is angled radially inwardly and a radially inner surface that is angled radially outwardly, the radially outer surface and the radially inner surface converging towards an axial end of the vortex generator, the fuel outlet provided on at least one of the radially outer surface or the radially inner surface of the vortex generator.

2. The turbine engine of claim 1, wherein the vortex generator comprises multiple vortex generators.

3. The turbine engine of claim 2, wherein each of the multiple vortex generators have a corresponding fuel outlet.

4. The turbine engine of claim 2, wherein the multiple vortex generators are at least one of axially spaced along the center body or circumferentially spaced along the center body.

5. The turbine engine of claim 1, wherein the vortex generator is a counter-rotating vortex generator.

6. The turbine engine of claim 1, wherein the vortex generator is a double-sided wedge, wheeler, wing, winglet, wishbone, hairpin, or wave-type.

7. The turbine engine of claim 1, further comprising a set of air outlets extending through the wall of the body, wherein the set of air outlets are located upstream of the fuel outlet.

8. The turbine engine of claim 1, wherein a first rotation of compressed air over the radially inner surface is in a first direction and a second rotation of compressed air over the radially outer surface is in a second direction different than the first direction.

9. The turbine engine of claim 1, wherein the air flow path includes a first air flow path diameter measured across the air flow path adjacent the inlet, and a second air flow path diameter measured across the air flow path adjacent to the outlet, and wherein the second air flow path diameter is in a range of 50% to 100% of the first air flow path diameter.

10. The turbine engine of claim 1, wherein the at least one fuel supply passage includes a fuel inlet portion fluidly coupled to at least one fuel supply, and wherein the fuel inlet portion has a fuel inlet diameter used to determine a cross-sectional area of the at least one fuel supply passage.

11. The turbine engine of claim 10, wherein the fuel outlet defines an outlet area, and wherein a ratio of the cross-sectional area of the at least one fuel supply passage to the outlet area is in a range from 0.005 to 0.1.

12. The turbine engine of claim 11, wherein the wall at the fuel outlet between the annular inner surface and an outer surface of the wall defines a bluff body area, and wherein a ratio of the outlet area to the bluff body area is in a range from 0.01 to 10.

13. The turbine engine of claim 1, wherein the fuel outlet is multiple fuel outlets and the vortex generator is multiple vortex generators circumferentially spaced along the center body, the vortex generators having radially inner surfaces, wherein the multiple fuel outlets are located at the radially inner surfaces.

14. A turbine engine comprising:

a compressor section, a combustion section including a combustor, and a turbine section in serial flow arrangement, the combustor comprising:

a combustion chamber;

a fuel injector defining a centerline and having a body with a wall having an annular inner surface, wherein the annular inner surface of the wall forms an air flow path fluidly coupling an inlet with an outlet open to the combustion chamber;

a center body located within the air flow path and having an internal fuel supply path, wherein the center body converges to a tip at a downstream end of the center body;

a vortex generator provided on the center body downstream of the inlet and fluidly exposed to the air flow path, wherein the vortex generator and the center body are spaced from the annular inner surface of the wall; and at least one fuel supply passage having a fuel outlet on an exterior of the center body and emitting fuel into the air flow path for mixing the fuel with air in the air flow path;

wherein the vortex generator has an outer surface that is angled radially inwardly towards the centerline and an inner surface that is angled radially outwardly away from the centerline, the outer surface and the inner surface converging towards an axial end of the vortex generator.

15. The turbine engine of claim 14, wherein the fuel outlet is located upstream, downstream, or on the vortex generator.

\* \* \* \* \*